United States Patent [19]

Goodman et al.

[11] 4,401,059

[45] Aug. 30, 1983

[54] FLUID INJECTION SYSTEM, AND FLOW CONTROL DEVICE USED THEREIN, FOR AN INTERNAL COMBUSTION ENGINE

[75] Inventors: Toronta P. Goodman, Summit Point, W. Va.; Bruce Everling, Fairfax, Va.

[73] Assignee: Goodman System Company, Inc., Armonk, N.Y.

[21] Appl. No.: 290,399

[22] Filed: Aug. 5, 1981

[51] Int. Cl.³ .................. F02D 19/00; F02M 25/02
[52] U.S. Cl. .................. 123/25 L; 123/25 A; 123/25 J; 123/25 R
[58] Field of Search .......... 123/25 R, 25 A, 25 L, 123/25 M, 25 N, 25 J, 198 A, 25 K; 261/18 A

[56] References Cited

U.S. PATENT DOCUMENTS

| | | | |
|---|---|---|---|
| 2,493,808 | 1/1950 | Garrigus | 123/25 R |
| 2,507,596 | 5/1950 | Hodgkins | 123/25 R |
| 2,835,233 | 5/1958 | Mellinger | 123/25 R |
| 3,631,843 | 1/1972 | Yeiser | 123/25 L |
| 3,911,871 | 10/1975 | Williams et al. | 123/25 K |
| 3,930,470 | 1/1976 | Douglas | 123/25 E |
| 3,987,774 | 10/1976 | Waag | 123/25 R |
| 4,016,837 | 4/1977 | Wentworth, Jr. | 123/25 R |
| 4,051,815 | 10/1977 | Coberley | 123/25 A |
| 4,078,527 | 3/1978 | Yasuda | 123/25 B |
| 4,096,829 | 6/1978 | Spears | 123/25 L |
| 4,125,092 | 11/1978 | Inamura | 123/25 B |
| 4,191,134 | 3/1980 | Goodman | 123/25 J |

*Primary Examiner*—Ira S. Lazarus

[57] ABSTRACT

A fluid injection system for an internal combustion engine such as a spark-ignition engine in which an injection nozzle injects a finely divided spray of fluid, such as water or a water solution, into the engine in response to a flow of atomizing air. The nozzle is connected to a fluid supply reservoir and to the outlet line of an air compressor for supplying air to the nozzle to induce the flow of fluid through the nozzle. A pressure responsive flow control device is provided that is responsive to engine load, as manifested by the pressure in the intake manifold, for controlling the flow of air to the nozzle, and therefore the discharge of fluid from the nozzle. As a result, the flow of atomizing air to the nozzle, and therefore the rate of fluid injection, is varied in response to variations in engine load.

15 Claims, 6 Drawing Figures

FLUID INJECTION SYSTEM, AND FLOW CONTROL DEVICE USED THEREIN, FOR AN INTERNAL COMBUSTION ENGINE

BACKGROUND OF THE INVENTION

The present invention relates to a system for injecting a fluid, such as water or a water solution, into internal combustion engines and, more specifically, to a fluid injection system and method for injecting fluid into spark-ignition engines in which the injection rate is proportional to the engine speed and engine load.

Various cooling fluids, such as water and water in solution with other substances, such as methanol or alcohol, have been commonly injected into hydrocarbon engines, both of the spark-ignition and compression-ignition type, to provide improved engine operation. The fluid absorbs heat within the combustion chamber and provides for an even burning rate to prevent, or at least greatly minimize, detonation of the fuel charge in the combustion chamber. In addition, the fluid tends to diminish the accumulation of carbon deposits within the combustion chamber and, because the combustion process takes place at a generally lower temperature, inhibits the formation of high-temperature pollutants, specifically the oxides of nitrogen ($NO_x$).

Various types of prior devices have been used to introduce cooling fluids into the intake air of internal combustion engines. These devices have included nozzle-type injectors in which the fluid is pumped directly into the engine and intake air humidifiers in which air is passed through a volume of water before being introduced into the engine. However, since the injection of a relatively low volume of fluid is desired when compared to the volume of fuel/air mixture introduced into the engine, it is difficult, if not impossible, to meter the fluid with the precision needed to insure optimum performance when it is pumped directly into the engine. Also, if humidified air is used, much less heat absorption is obtained when compared to water, since the humidified air has a lower density than dry air with water droplets.

These prior devices suffer from additional problems, since they are usually operated solely in response to engine speed, or by the exhaust gases from the engine, either directly or as modified by the engine intake manifold pressure. Although these techniques result in a fluid injection rate that may be adequate under certain engine operating conditions, such as a constant-speed cruise condition, the injection rate during other engine operating conditions, such as acceleration and deceleration, may be too little or too much. When the fluid injection rate is insufficient, the beneficial effects of the cooling fluid are, of course, not obtained. Conversely, when the injection rate is too high, the surplus fluid within the combustion chamber tends to quench the combustion process and, of course, diminish engine performance.

SUMMARY OF THE INVENTION

It is therefore an object of the present invention to provide a system for injecting a fluid, such as water or a water solution, into the air intake side of an internal combustion engine in response to the flow of atomizing air through a nozzle to obtain a precise metering of the injected fluid.

It is another object of the present invention to provide a fluid injection system of the above type in which the fluid is injected in response to engine load.

It is still another object of the present invention to provide a fluid injection system of the above type in which a compressor is provided for introducing atomizing air to the nozzle and a control device varies the air flow in response to variations in engine load.

It is still another object of the present invention to provide a control device for responding to engine load as manifested by the pressure in the intake manifold of the engine and controlling the flow of air to the nozzle accordingly.

It is still another object of the present invention to provide a fluid injection system and flow control device of the above type which are inexpensive to manufacture and which are simple and reliable in operation.

It is a further object of the present invention to provide a fluid injection system and flow control device of the above type which are easy to install on an internal combustion engine and which are ideally suited for aftermarket installations on previously manufactured vehicles.

Towards the fulfillment of these and other objects, the fluid injection system of the present invention includes a fluid injecting device, such as a jet nozzle, which is located on the air intake side of an engine to introduce fluid in finely divided form into the intake air of the engine. The nozzle is connected to both a supply of cooling fluid and to a source of air which passes through the nozzle to draw the fluid through the nozzle and into the engine. A control device is connected to the air source and to the intake manifold to vary the flow of air to the nozzle in response to variations in the intake manifold vacuum. Thus, air is introduced to the nozzle, and fluid injected from the nozzle, in response to engine load.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention, when taken in conjunction with the accompanying drawings wherein.

DESCRIPTION OF THE PREFERRED EMBODIMENT

Figure 1:
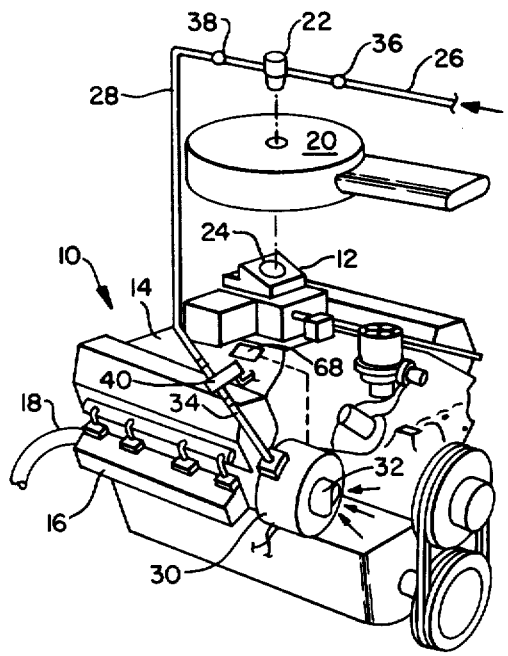
FIG. 1 is an exploded perspective view of an exemplary internal combustion engine equipped with the system and device of the present invention with certain components being shown schematically and with selected parts of the engine being omitted in the interest of clarity.

An exemplary internal combustion engine incorporating the fluid injection system of the present invention is shown in FIG. 1 and is generally referred to by the reference numeral 10. The engine 10 is of conventional design and includes a carburetor 12 mounted on an intake manifold 14 for introducing a fuel/air charge into the combustion chambers of the engine. An exhaust manifold 16 is provided on each side of the engine for directing the exhaust gases produced during the combustion process through an exhaust system 18 (partially shown). An air cleaner, or other plenum, 20 is provided which normally is mounted over the carburetor 12 and which has an opening formed therein for receiving a fluid injection jet, or nozzle, 22 which is adapted to inject fluid, such as water or a water solution, into the intake air side of the engine 10. In the preferred embodiment, the nozzle 22 is mounted in the air cleaner 20 above an inlet opening 24 of the carburetor 12 to direct a downwardly diverging flow of finely divided fluid droplets into the intake air entering the opening 24, as will be described.

The nozzle 22 is connected to the source of fluid through a hose 26 in a manner also to be described, and is also connected, via a hose 28, to the outlet of a compressor, or air-injection pump, 30. The compressor 30 can be driven at a constant speed in any known manner, such as by an electric motor, or the like, (not shown) and includes an axially extending inlet conduit 32 through which ambient air is drawn in by the force generated by the compressor. An outlet conduit 34, preferably in the form of a hose, extends from the compressor 30 and is connected to the hose 28 in a manner to be described. The air supplied through the hose 28 to the nozzle 22 from the outlet of the compressor 30 serves to induce the flow of fluid through the hose 26 and to the nozzle 22 for discharge into the carburetor 12 in a manner to be described. A pair of valves 36 and 38 are provided in hoses 26 and 28, respectively, to prevent any reverse flow of fluid and air, respectively, from the nozzle 22.

Figure 2:
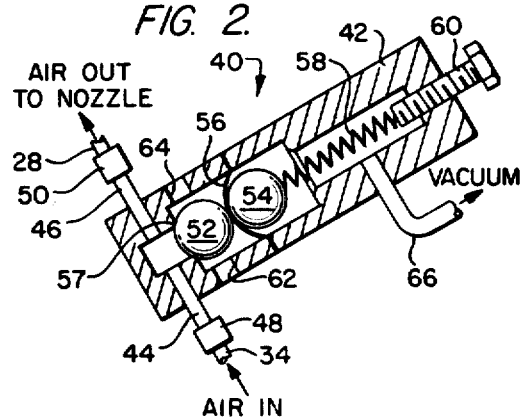
FIG. 2 is an enlarged cross-sectional view of a flow control device used in the system of FIG. 1.

A pressure responsive, air flow control device, shown in general by the reference numeral 40, is disposed between the hoses 34 and 28 and is better shown in FIG. 2. More particularly, the device 40 consists of a hollow, elongated housing 42 having an inlet hose 44 and an outlet hose 46 extending therefrom and communicating with its interior. The hoses 44 and 46 are connected to the hoses 34 and 28, by clamps 48 and 50, respectively, to permit, under certain conditions to be described, the passage of air from the hose 34 to the hose 28.

A pair of ball valves 52 and 54 are provided in an enlarged interior portion of the housing 42 and extend to either side of a membrane 56 extending across the latter interior portion and affixed to the housing in a suitable manner. The ball valve 52 moves to and from a valve seat 57 disposed in the interior of the housing 42, and communicating with the hoses 44 and 46.

A spring 58 is disposed in the interior of the housing 42 and extends between the ball valve 54 and an adjustment screw 60 threadedly engaging a threaded bore formed through an end wall of the housing. The screw 60 thus can be rotated to vary its axial position in the housing and thus vary the force of the spring 58 on the ball valve 54.

A pair of openings 62 and 64 are formed through the wall of the housing at a location between the valve seat 57 and the membrane 56 for permitting the bleeding, or discharge, of air from the interior of the housing under conditions to be described. A vacuum hose 66 extends from the housing 42 at a location between the membrane 56 and the screw 60 and communicates at one end with the interior of the housing and at its other end with the intake manifold 14 (FIG. 1).

As a result of the foregoing, in the absence of a predetermined vacuum in the intake manifold 14, the spring 58 will overcome the force exerted by atmospheric pressure from the openings 62 and 64 acting on the membrane 56 and the force exerted by the pressurized air from the inlet hose 46, and urge the ball valves 52 and 54 into the position shown in FIG. 2, i.e., where the valve 52 is seated on the seat 57. This blocks air flow to openings 62 and 64, and the air thus passes from the inlet hose 44, through the housing 42, and directly to the outlet hose 46 for passage into the nozzle supply hose 28. However, when the vacuum in the intake manifold 14 increases to a point that the forces exerted by it, and the air pressure and atmospheric pressure on the membrane 56 are sufficient to overcome the force of the spring 58, the ball valve 52 will move from the seat 57 and thus permit air from the inlet hose 44 to pass from the housing 42 out through the openings 62 and 64 into atmosphere.

The size of the ball valve 52 relative to the interior housing portion in which it moves and relative to the size and location of the seat 55 and the openings 62 and 64 is such that the relative amounts of air flowing directly from the interior of the housing 42 to the hose 46 and to the openings 62 and 64 will vary with movement of the ball valve 52 in the interior of the housing 42 in response to variations in the vacuum in the intake manifold 14. When the latter vacuum reaches a predetermined maximum (in the negative sense) value, the ball valves 52 and 54 move to the position shown in FIG. 3 where all the air from the hose 44 is bled to atmosphere through the openings 62 and 64.

It is understood that the compressor 30 can be driven by an electrical motor connected to the vehicle battery through an ignition switch and through a switch that activates the compressor only when the engine is started. For example, the latter switch could be connected to a sensor, or the like, that is responsive to a predetermined oil pressure in the engine block for activating the electric motor associated with the compressor 30.

A temperature responsive control unit 68 (FIG. 1) is mounted on the surface of the intake manifold 14 adjacent the device 40 and is connected to the compressor 30 as shown by the dashed line. It is understood that the control unit 68 includes a temperature responsive probe or thermostat (not shown) for responding to a predetermined engine temperature for selectively activating and deactivating the compressor 30 in a conventional manner, as will be described.

Figure 4:
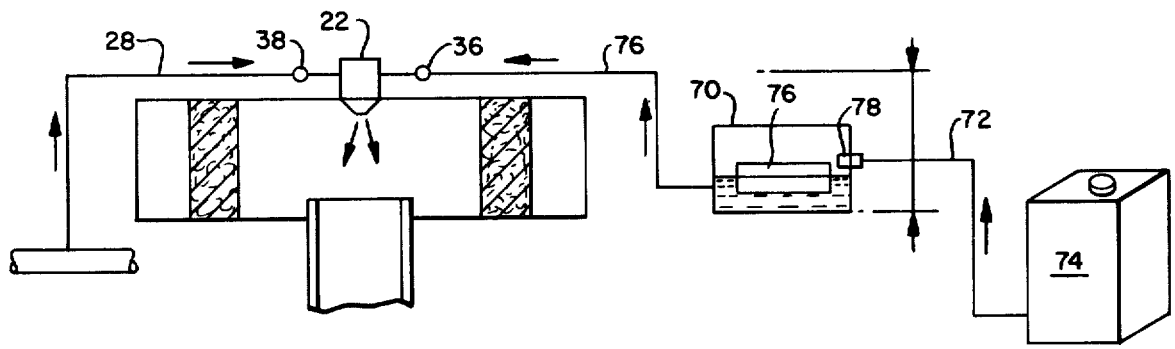
FIG. 4 is a schematic representation of a portion of the fluid injection system of FIG. 1.

As shown in FIG. 4, the hose 26 is connected to a float-bowl reservoir 70 which, in turn, is connected through a supply line 72 to a fluid container 74. The float-bowl reservoir 70 includes a float 76 that operates an inlet valve 78 which can be of the needle valve type, to maintain a uniform level of cooling fluid within the reservoir 70 in a conventional manner. In the preferred embodiment, the fluid is in the form of water, or water in solution with other substances, such as methanol or alcohol, and the container 74 is provided with a pump (not shown) for pumping the fluid to the reservoir 70. Also, the float 76 is located at a selected elevation below the elevation of the nozzle 22 to prevent the fluid from unintentionally flowing under the influence of gravity to and through the nozzle 22. The reservoir 70, while not necessary to the operation of the system of the present invention, permits the supply container 74 to be located remotely from the engine 10 at a convenient elevation relative to the nozzle 22.

Figure 5:
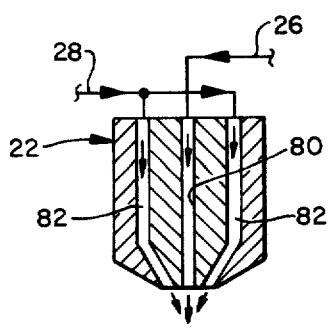
FIGS. 5 and 6 are cross-sectional views of two exemplary fluid injection nozzles suitable for use with the system of the present invention.
Figure 6:
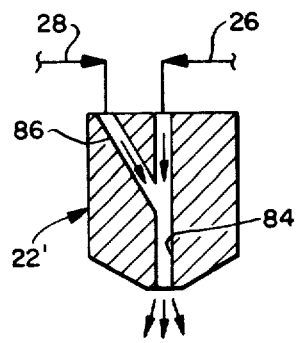

The nozzle 22 is adapted to provide a downwardly directed and preferably diverging flow of finely divided fluid droplets in response to the flow of air through the nozzle. While many different types of nozzles are suitable for use with the present invention, the nozzle 22 of the type shown in FIG. 5 is preferred which includes a central bore 80 for receiving the fluid from the hose 26 and a plurality of circumferentially arranged atomizing air supply bores 82 for receiving air from the hose 28 and for directing the flow of air to the otlet of the bore 80. The flow of air past the outlet of the bore 80 creates a low pressure zone which induces, or draws, fluid from the hose 26 through the bore 80 in a conventional manner, where it is mixed with, and atomized by, the air passing into the inlet 24 of the carburetor 12. In the alternative, a nozzle 22' of the type shown in FIG. 6 may be provided which has a central bore 84 connected to the fluid supply hose 26 and an air-injection bore 86 connected to the air supply hose 28 that opens into the central bore 84 at an acute angle to effect the induction and atomizing function.

In operation, and assuming the compressor 30 is driven by an electrical motor connected to the vehicle battery through an ignition switch, upon turning on the ignition switch and starting the engine, the electric motor, and therefore the compressor 30, will be activated to draw in ambient air through the inlet conduit 32 where it is pressurized and passed at a constant flow rate, via the hose 34, to the inlet hose 44 of the flow control device 40. During idle conditions of the vehicle the relatively high vacuum that exists in the intake manifold 14 is communicated, via the vacuum hose 66, to the interior of the housing 42 of the flow control device 40. This, plus the effects of the pressure of the air entering the housing 42 from the hose 44 and atmospheric pressure from the openings 62 and 64 acting on the diaphragm 56, will move the ball valves 52 and 54 against the force of the spring 58 to the position shown in FIG. 3 so that all of the air introduced to the housing 42 from the inlet house 44 is bled from the openings 62 and 64 into atmosphere. Thus, the nozzle 22 will receive no air and will not inject any water into the carburetor 24.

During cruise conditions of the vehicle, the vacuum in the intake manifold decreases until the force of the spring 58 is greater than the combined forces of the latter vacuum, the pressurized air from the inlet hose 46, and the atmospheric pressure acting on the membrane 56. As a result, the ball valve 52 is moved towards the seat 57 and thus partially blocks flow through the passages 62 and 64, permitting the flow of some air directly through the housing 42 and to the outlet hose 44 for introduction to the nozzle 22 via the hose 28. This movement continues in response to further reductions in manifold vacuum correspond to increasing load conditions until the ball valves 52 and 54 attain the position of FIG. 2, corresponding to a "wide-open" throttle condition. In this position, all of the air from the inlet hose 44 passes directly through the housing 42 and to the outlet hose 46 and the nozzle supply hose 28, resulting in a maximum injection of water.

Figure 3:
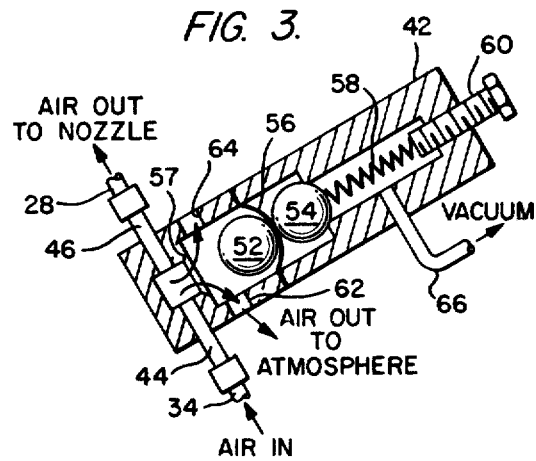
FIG. 3 is a view similar to FIG. 2, but depicting the device of FIG. 2 in a different operational mode.

Of course, during normal driving conditions, the ball valves 52 and 54 will move between the two extreme positions depicted in FIGS. 2 and 3 in response to variations in the inlet manifold vacuum caused by variations in engine load. Thus, the air supplied to the nozzle 22 and the resulting injection of water into the carburetor 24, varies in response to engine load.

As indicated above, the control unit 68 operates to deactivate the compressor 30 under selected temperature conditions of the engine 10. More particularly, the compressor 30 is deactivated by the control unit 68 during cold status, and continues in this mode until the engine temperature reaches a preselected value at which time it functions to place the compressor in the activated state as described above. Also, the aforementioned oil pressure responsive switch prevents the compressor 30 from being activated in the absence of a predetermined oil pressure in the engine block.

Since the air passing through the nozzle 22 is at a much higher pressure and flow rate when compared to the water, a relatively high volume of air is used to control a much smaller volume of water, which enables a very precise metering of the water to be obtained.

As a result of the foregoing, the fluid injection system of the present invention operates only at times which are optimum as determined by the critical operating modes of the engine. This, plus the precise metering of the water that is achieved by the system of the present invention, can result in a dramatic increase in engine efficiency.

While the preferred embodiments of the fluid injection system of the present invention has been shown in combination with the engine illustrated in FIG. 1, as will be apparent to those skilled in the art, the fluid injection system can be applied to any one of a plurality of different types of engines including 4-cylinder, 6-cylinder and V-8 engines. Also, the present invention is not limited to use with engines having a carburetor for mixing air and fuel but can easily be adapted to fuel injection and stratified charge engines by directing the cooling fluid directly into the cylinder of the engine through an appropriate inlet. Also, although reference has been made to the terms "cooling fluid", "water", and "water in solution", it is understood that other types of fluids can be injected that affect the combustion process, such as octane improvers, anti-detonates, and oxygen additives, etc.

Still other variations in the foregoing can be made within the scope of the invention. For example, although reference is made to the use of hoses to connect the various components in fluid flow communication, it is understood that other conduits such as tubing, pipes, etc. can be used. Also, the control device 40 can be connected to the inlet side of the compressor 30 rather than to the outlet side, as disclosed above, with the design of the device being changed as necessary. Further, a demand regulator, or the like, can be provided in place of the float-bowl reservoir 100 to provide the fluid to the hose 26, and the position and location of the nozzle 22 can be varied as long as it is effective to introduce the fluid into the intake air side of the engine 10.

Still further, other types of valves other than the ball valves 52 and 54 can be used. As also will be apparent from those skilled in the art, still other changes and modifications may be made to the water injection system of the present invention without departing from the spirit and scope of the invention and recited in the appended claims and their legal equivalent.

What is claimed is:

1. A system for injecting fluid into a cylinder of an internal combustion engine, said system comprising fluid injection means for introducing air to said fluid for injecting said fluid into said cylinder at a rate proportional to the flow of said air; means for supplying air to said fluid injection means, said air supply means including a compressor for supplying pressurized ambient air at a constant flow rate, and means connecting said compressor to said fluid injection means; and control means in a responsive relation to the intake manifold of said engine and connected to said air supply means for varying the flow of air to said fluid injection means in response to pressure variations in said intake manifold.

2. The system of claim 1 wherein said fluid injection means comprises a nozzle connected to a source of fluid and to said connecting means, said nozzle including fluid and air flow passages formed and arranged in a manner to draw said fluid from a supply of fluid and through said fluid flow passage in response to the flow of air through said air flow passage.

3. The system of claim 2 wherein said fluid and air flow passages are further formed and arranged to mix said fluid and air upon their discharge from said nozzle.

4. The system of claim 1 wherein said control means is connected to said connecting means.

5. The system of claim 1 wherein said control means comprises a housing, means extending from said housing into said intake manifold for communicating the pressure in said intake manifold to the interior of said housing, means establishing a direct air passage through said housing, means defining at least one air bleed passage through said housing, valve means for controlling the flow of air through said direct air passage and said air bleed passage, pressure responsive means in said housing for controlling the movement of said valve means and, therefore, the relative flow of air through said direct air passage and said air bleed passage in response to pressure variations in said intake manifold.

6. The system of claim 5 wherein said valve means comprises at least one valve movable to and from a seat formed in said housing and a membrane extending across the interior of said housing.

7. The system of claim 6 wherein said pressure responsive means comprises means including a spring for exerting a force on one surface of said membrane and means for varying the magnitude of said force.

8. The system of claim 7 wherein the other surface of said membrane is exposed to atmospheric pressure via said bleed passage and to air pressure via said direct passage.

9. The system of claim 6 wherein said valve moves in the interior of said housing to vary the effective size of said bleed passage and, therefore, said relative flow.

10. The system of claim 1 further comprising a temperature sensor responsive to the temperature of said engine and connected to said compressor for deactivating said compressor in response to the temperature of said engine being below a predetermined value.

11. An air flow control device for use in a water injection system for an internal combustion engine in which water is injected into the engine in proportion to the flow of air, said device comprising a housing, means extending from said housing into said intake manifold for communicating the pressure in said intake manifold to the interior of said housing, means establishing a direct air passage through said housing, means defining at least one air bleed passage through said housing, valve means for controlling the flow of air through said direct air passage and said air bleed passage, and pressure responsive means in said housing for controlling the movement of said valve means and, therefore, the relative flow of air through said direct air passage and said air bleed passage in response to pressure variations in said intake manifold.

12. The system of claim 11 wherein said valve means comprises at least one valve movable to and from a seat formed in said housing and a membrane extending across the interior of said housing.

13. The system of claim 12 wherein said pressure responsive means comprises means including a spring for exerting a force on one surface of said membrane and means for varying the magnitude of said force.

14. The system of claim 13 wherein the other surface of said membrane is exposed to atmospheric pressure via said bleed passage and to air pressure via said direct air passage.

15. The system of claim 12 wherein said valve moves in the interior of said housing to vary the effective size of said bleed passage and, therefore, said relative flow.

* * * * *